United States Patent [19]
Wesley et al.

[11] Patent Number: 6,104,695
[45] Date of Patent: Aug. 15, 2000

[54] REPAIR TTL COMPUTATION AND CORRECTION MECHANISM TO PERFORM LOCALIZED REPAIRS IN A MULTICAST DATA DISTRIBUTION SETUP/FRAMEWORK

[75] Inventors: Joseph S. Wesley, Quincy; Radia J. Perlman, Acton, both of Mass.; Stephen A. Hurst, Nashua, N.H.; Stephen R. Hanna, Bedford, Mass.; Miriam C. Kadansky, Westford, Mass.; Philip M. Rosenzweig, Acton, Mass.

[73] Assignee: Sun Microsystems, Inc., Palo Alto, Calif.

[21] Appl. No.: 09/052,201

[22] Filed: Mar. 31, 1998

[51] Int. Cl.[7] ............................ G01R 31/08; H04H 1/00; H04L 12/66

[52] U.S. Cl. .......................... 370/216; 370/242; 370/312; 370/356

[58] Field of Search ..................................... 370/390, 216, 370/242, 244, 252, 432, 312; 714/1, 2, 3, 4

[56] References Cited

U.S. PATENT DOCUMENTS 5,675,741  10/1997  Aggarwal et al. ................. 395/200.12

OTHER PUBLICATIONS

Log–Based Receiver–Reliable Multicast for Distributed Interactive Simulation by Hugh W. Holbrook, Sandeep K. Singhal, David R. Cheriton, Department of Computer Science, Stanford University, pp. 328–341.

A Reliable Multicast Framework for Light–weight Sessions and Application Level Framing by Sally Floyd, Van Jacobson, Steven McCanne of Lawrence Berkeley Laboratory, University of California,Berkeley, CA 94720, Ching–Gung Liu of University of Southern California, Los Angeles, CA 90089, Lixia Zhang of Xerox PARC 3333 Coyote Hill Road, Palo Alto, CA 94304, pp. 342–356.

Multicast Transport Protocols: A Survey and Taxonomy by Katia Obraczka, Information Science Institute, University of Southern California, IEEE Communication Magazine, Jan., 1998, pp. 94–102.

Reliable Multicast Transport Protocol (RMTP), by Sanjoy Paul, Member IEEE, Krishan K. Sabnani, Fellow, IEEE, John C.–H. Lin and Supratik Bhattacharyya, IEEE Apr. 1997, pp. 407–420.

A Reliable Dissemination Protocol for Interactive Collaborative Applications by Rajendra Yavatkar, James Griffioen, and Madhu Sudan, Department of Computer Science, University of Kentucky, Lexington, KY 40506, pp. 1–13.

(List continued on next page.)

*Primary Examiner*—Ajit Patel
*Assistant Examiner*—Hanh Nguyen
*Attorney, Agent, or Firm*—Weingarten, Schurgin, Gagnebin & Hayes LLP

[57] ABSTRACT

Determination of a Time To Live ("TTL") hop count for repair data units transmitted from a repair head to a standard destination device in a communications network is facilitated for multicast transmission. The repair head destination device monitors the path between the repair head destination device and the standard destination devices by exchanging messages with the respective standard destination devices. The repair head transmits control messages to each destination device including a dispatched TTL value and an Internet Protocol ("IP") TTL value. If the control message fails to reach one of the standard destination devices, that standard destination device transmits a transmission failure indication to the repair head destination device. In response to the transmission failure indication the TTL value employed for the control message is increased. Following receipt of the control message, the standard destination device calculates the TTL value required to transmit a data unit from the repair head to the standard destination device by subtracting the IP TTL value from the dispatched TTL value. If the calculated TTL difference value is non-zero then an excess-TTL indication is transmitted from the standard destination device to the repair head destination device.

16 Claims, 5 Drawing Sheets

OTHER PUBLICATIONS

RMTP: A Reliable Multicast Transport Protocol, by John C. Lin, Department of Computer Sciences, Purdue University, West Lafayette, Indiana 47907 and Sanjoy Paul, AT&T Bell Laboratories, Holmdel, New Jersey, 07733, pp. 1–11.

A Reliable Multicst Framework for Light–weight Sessions and Application Level Framing, by Sally Floyd, Van Jacobson, Steven McCanne of Lawrence Berkeley Laboratory, University of California, Los Angeles, CA 90089, and Lixia Zhang, of Xerox PARC, 3333 Coyote Hill Road, Palo Alto, CA 94304, pp. 1–37.

REPAIR TTL COMPUTATION AND CORRECTION MECHANISM TO PERFORM LOCALIZED REPAIRS IN A MULTICAST DATA DISTRIBUTION SETUP/FRAMEWORK

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to network communications, and more particularly to control of multicast data unit transmission via a "Time To Live" designator.

Multicast transmission is employed in a communications network to transmit data units from a single source to a plurality of destinations. In particular, a single multicast transmission can be made in lieu of a plurality of unicast transmissions to destinations that are designated to receive identical data from the source. The multicast data unit is transmitted and then replicated as necessary by the network devices to provide copies for each destination. Replication of the multicast data unit may be postponed until the data unit reaches a network device that is nearer to the destination than the source, thereby conserving transmitter and network bandwidth.

Because each multicast transmission from the source device results in a plurality of data units being transmitted through portions of the network, it is particularly desirable to limit transmission beyond the intended destination devices. It is known in the art to employ a Time To Live ("TTL") hop count designator in the Internet Protocol ("IP") multicast data unit header to limit transmission of multicast data units beyond the intended destinations. Intermediate network devices are often coupled between the destination device and the source device. When the multicast data unit is received in a network device, the TTL hop count of the data unit is decremented. When the TTL hop count reaches zero, the data unit is discarded. Prior to transmission of a multicast data unit the source device calculates the number of respective intermediate devices, i.e., "hops," interposed between the source device and each destination device. The source device employs a single TTL designator value ("session TTL") for the multicast data unit. In particular, the session TTL is calculated to be sufficiently large to allow the multicast data unit to reach the destination device with the greatest number of intermediate devices interposed between it and the source device. Hence, after a predetermined number of hops the data unit is discarded and transmission of the multicast data unit beyond the destination devices is limited.

One problem associated with multicast transmission is inefficient operation. Multicast data units are typically afforded only low priority by intermediate network devices. Consequently, when an intermediate network device encounters operational difficulties, such as overflowing buffers, the multicast data units are candidates for early discard. Retransmission of lost or discarded data units, known in the art as "repair," may be requested by each destination device for each data unit delivery failure. However, transmission of multiple repair requests and corresponding repair data units between the source device and the destination devices is wasteful of network bandwidth.

Another problem associated with multicast operation is transmission failure due to inaccurate information regarding destination devices. Connectionless transmission protocols such as Unreliable Data Protocol ("UDP") are typically employed for multicast data units. In accordance with the connectionless transmission protocols, the destination device does not acknowledge receipt of a data unit. Consequently, the source device may not receive timely notification that a link between the source and destination has been altered in a manner which inhibits receipt of data units by the destination device.

It is known to employ a destination device as a "repair head" to retransmit lost data units. A standard destination device for a multicast transmission is associated with another destination device for the multicast transmission that serves as the repair head. Copies of multicast data units transmitted from the source device to the head destination device are retained in the head destination device. In the event that the standard destination device fails to receive a multicast data unit transmitted from the source device (which may also serve as a repair head), the standard destination device transmits a request for repair to the head destination device that is associated with that standard destination device. In response to the request for repair, a stored copy of the requested data unit ("repair data unit") is transmitted from the head destination device to the standard destination device. The TTL designator in the repair data unit, i.e., the "repair TTL," is set lower than the TTL designator in the original data unit transmitted by the source device, i.e., the "session TTL," in order to limit superfluous transmission of the repair data unit beyond the intended standard destination device.

Techniques such as Tree Based Multicast Protocol ("TMTP") and Scalable Multicast Protocol ("SRM") employ repair heads to make repairs. However, these techniques operate under an assumption that symmetrical paths exist between the head destination device and the standard destination device. In fact, the actual path configuration may be asymmetrical, i.e., the number of network devices along the path from the head destination device to the standard destination device may differ from the number of intermediate network devices along the path from the standard destination device to the head destination device. If the paths are assumed to be symmetrical and the actual path configuration is asymmetrical, the repair data unit may fail to reach the standard destination device that has requested the repair because the repair TTL value may not be large enough to enable the repair data unit to traverse all of the intermediate devices.

BRIEF SUMMARY OF THE INVENTION

Consistent with the present invention, a head destination device monitors the path between the head destination device and associated standard destination devices in order to detect path asymmetry and path modification and, in response, to more efficiently set a repair TTL designator in repair data units. The head destination device monitors the path between the head destination device and the standard destination device by exchanging messages with the standard destination devices. In particular, the head destination device multicasts control messages to every standard destination device that is associated with the head destination device. Each control message includes a "dispatch TTL" value that is loaded in the data message header. The dispatch TTL value is also loaded as an IP TTL value by the head destination device. When the multicast control message traverses through the network, the IP TTL value is decremented at intermediate network devices until the control message reaches the standard destination device. The dispatch TTL value loaded into the data message header remains unchanged as the control message traverses through the network. The standard destination device computes the TTL value required for transmission of a data unit from the head destination device to the standard destination device by subtracting the IP TTL value from the dispatch TTL value.

If the control message fails to reach the standard destination device, the standard destination device transmits an indication to the head destination device via a feedback message. In response to the indication from the standard destination device that control message transmission failed the head destination device increases the repair TTL by a predetermined value. The head destination device increases the repair TTL by the predetermined value each time a control message transmission failure indication is received by the head destination device.

If the control message is received by the standard destination device, the standard destination device calculates the repair TTL value required to transmit a data unit from the head destination device to the standard destination device by subtracting the IP TTL value from the dispatch TTL value. If the calculated TTL difference value is non-zero then an indication is transmitted from the standard destination device to the head destination device via an excess TTL message. The head destination device employs the excess TTL messages from the associated standard destination devices to determine whether to reduce the repair TTL value employed.

BRIEF DESCRIPTION OF THE DRAWINGS

The foregoing features of this invention, as well as the invention itself, may be more fully understood from the following Detailed Description of the Invention, and Drawings, of which.

DETAILED DESCRIPTION OF THE INVENTION

Figure 1:
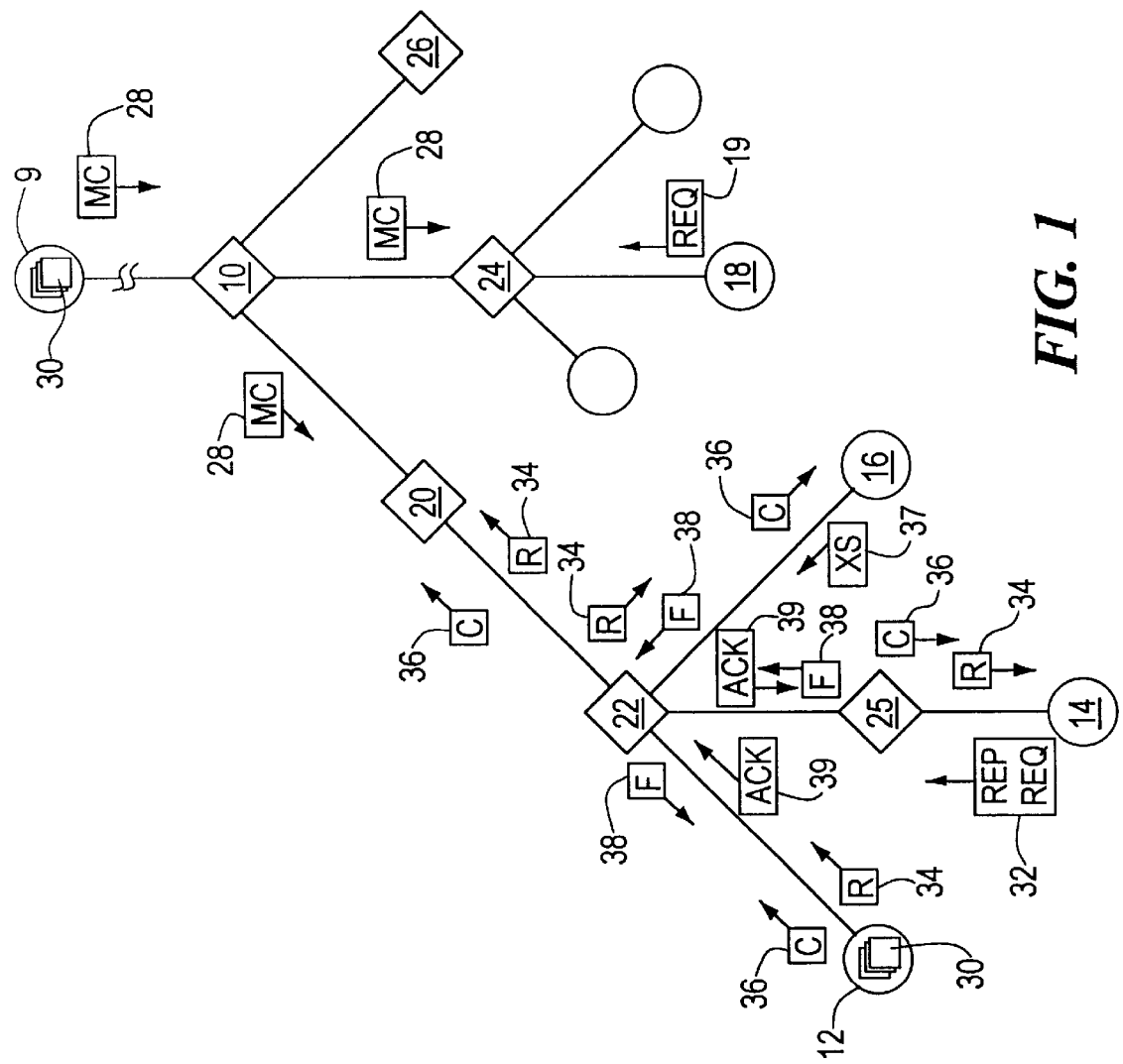
FIG. 1 is a schematic representation of a communications network utilizing localized repair for incomplete multicast transmission consistent with the present invention.

Referring now to FIG. 1, an exemplary communications network consistent with the present invention includes at least one source device 9 such as an end-station that could be a computer, switch, bridge, router, printer, memory or any other networkable electronic device, a plurality of destination devices 12, 14, 16, 18 such as end-stations and a plurality of intermediate network devices 10, 20, 22, 24, 25, 26 such as routers or other switching devices. Selected ones of the destination devices are designated as repair heads. In the illustrated example, destination device 12 is designated as a repair head. The source device 9 may also serve as a repair head. Each standard destination device 14, 16, 18 is associated with a repair head destination device such as repair head destination device 12.

In order to transmit data from the source device 9 to each destination device 12, 14, 16, 18, a multicast data unit 28 containing data is transmitted from the source device 9 to intermediate device 10, where the multicast data unit is replicated for transmission on multiple network paths. In particular, the multicast data unit 28 is replicated at device 10 for transmission on a first path to device 22 via device 20 and on a second path to device 18 via device 24. The multicast data unit is further replicated in device 22 for transmission to repair head destination device 12 and standard destination device 16, and also to standard destination device 14 via intermediate device 25.

In order to become associated with a repair head the standard destination device transmits a data unit including a membership request message 19 into the network. When the repair head destination device receives the request message a determination is made whether to become associated with the standard destination device. If a determination is made to become associated with the standard destination device a binding operation is employed, as is known in the art.

The repair head destination device 12 retains a copy 30 of each multicast data unit 28 that is transmitted from the source device 9 to the destination devices for repair purposes. If a standard destination device, e.g., destination device 14, fails to receive a multicast data unit 28 transmitted from the source device 9, the standard destination device 14 transmits a control data unit including a request for repair message 32 to the repair head destination device 12. The standard destination device may determine that transmission of a data unit has failed by tracking a sequence-indicating field in the header of the data unit or any other technique known in the art. If sequence tracking is employed then the lost data unit will not be identified until a subsequent data unit is received by the standard destination device. In response to the request for repair message 32, a repair data unit 34 is multicast from the repair head destination device 12 to the standard destination device 14. The retained multicast data unit copy 30 is employed to provide the repair data unit 34.

A Time To Live ("TTL") hop count value is designated for the multicast data unit 28 by the source device 9 in order to limit transmission of multicast data units beyond the destination devices 12, 14, 16, 18. When the multicast data unit is received in an intermediate network device, the TTL hop count of the multicast data unit is decremented. If the TTL hop count reaches zero, the data unit is discarded. Prior to transmission, the source device 9 calculates the number of intermediate devices interposed between the source device and each destination device and employs a single TTL designator value ("session TTL") for the multicast data unit 28 that is calculated to be large enough to allow the multicast data unit 28 to reach the destination device with the greatest number of intermediate devices interposed between it and the source device.

A TTL is also employed for the repair data unit 34. In particular, the repair data unit 34 includes a TTL hop count value that is designated by the repair head destination device 12. The repair TTL is set lower than the session TTL designator in the original data unit 28 transmitted by the source device 9. The repair head destination device 12 monitors the paths between the repair head destination device 12 and the standard destination devices 14, 16, 18 in order to determine the number of intermediate devices that are interposed between the repair head destination device and the standard destination devices and set an appropriate repair TTL designator for the repair data unit 34.

The repair head destination device 12 ascertains the number of intermediate network devices on the paths between the repair head destination device 12 and the standard destination devices such as destination device 14 by exchanging messages with the standard destination devices. In particular, the repair head destination device 12 multicasts control messages 36 to each destination device 14, 16, 18 that is associated with the repair head destination device 12. Each control message 36 includes a "dispatch TTL" value that is loaded in the data message header. The dispatch TTL value is also loaded as an IP TTL value by the repair head destination device 12. When the multicast control message traverses through the network, the IP TTL value is decremented at intermediate network devices until the control message reaches the standard destination device. The dispatch TTL value loaded into the data message header remains unchanged as the control message traverses through the network. The standard destination device computes the TTL value required for transmission of a data unit from the repair head destination device to the standard destination device by subtracting the IP TTL value from the dispatch TTL value. An indication of the result of the computation is then provided to the repair head destination device for utilization in the transmission of repair messages.

An indication of a non-zero computed TTL difference is transmitted from the standard destination device 16 to the repair head destination device 12 via an excess TTL message 37. Excess TTL messages 37 are employed by the repair head destination device to update the repair TTL. In particular, the repair head destination device compares the respective TTL difference values (Dispatch TTL—IP TTL) and selects a repair TTL value that is calculated to enable repair data units to reach the standard destination device that requires the greatest number of intermediate device hops. If the TTL difference is calculated by the standard destination device to be zero then no excess TTL message is transmitted, and the result is indicated to the repair head destination device via the absence of the excess TTL message.

If successive control messages 36 from the repair head destination device 12 are not received by one or more of the standard destination devices within a predetermined period of time defined by a control message counter that is maintained in each standard destination device, a feedback message 38 indicating that the anticipated control message 36 was not received by the standard destination device is transmitted from the timed-out standard destination device to the repair head destination device. In response to the feedback message 38 the repair head destination device transmits an acknowledgement message 39 to the timed-out standard destination device and increments the repair TTL by a predetermined value.

Figure 2:
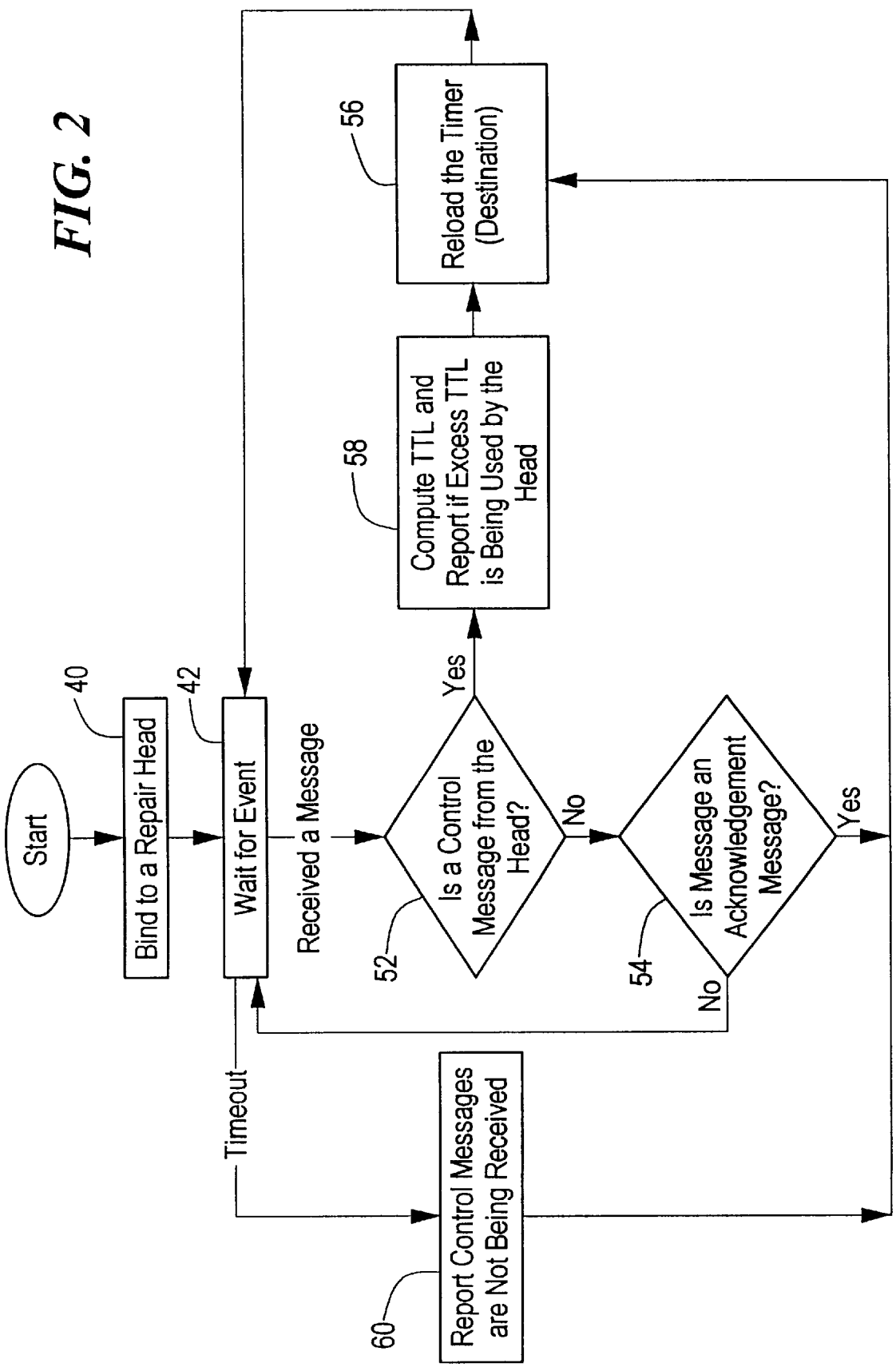
FIG. 2 is a flow diagram illustrating a method for operating the standard destination device consistent with the present invention.
Figure 3:
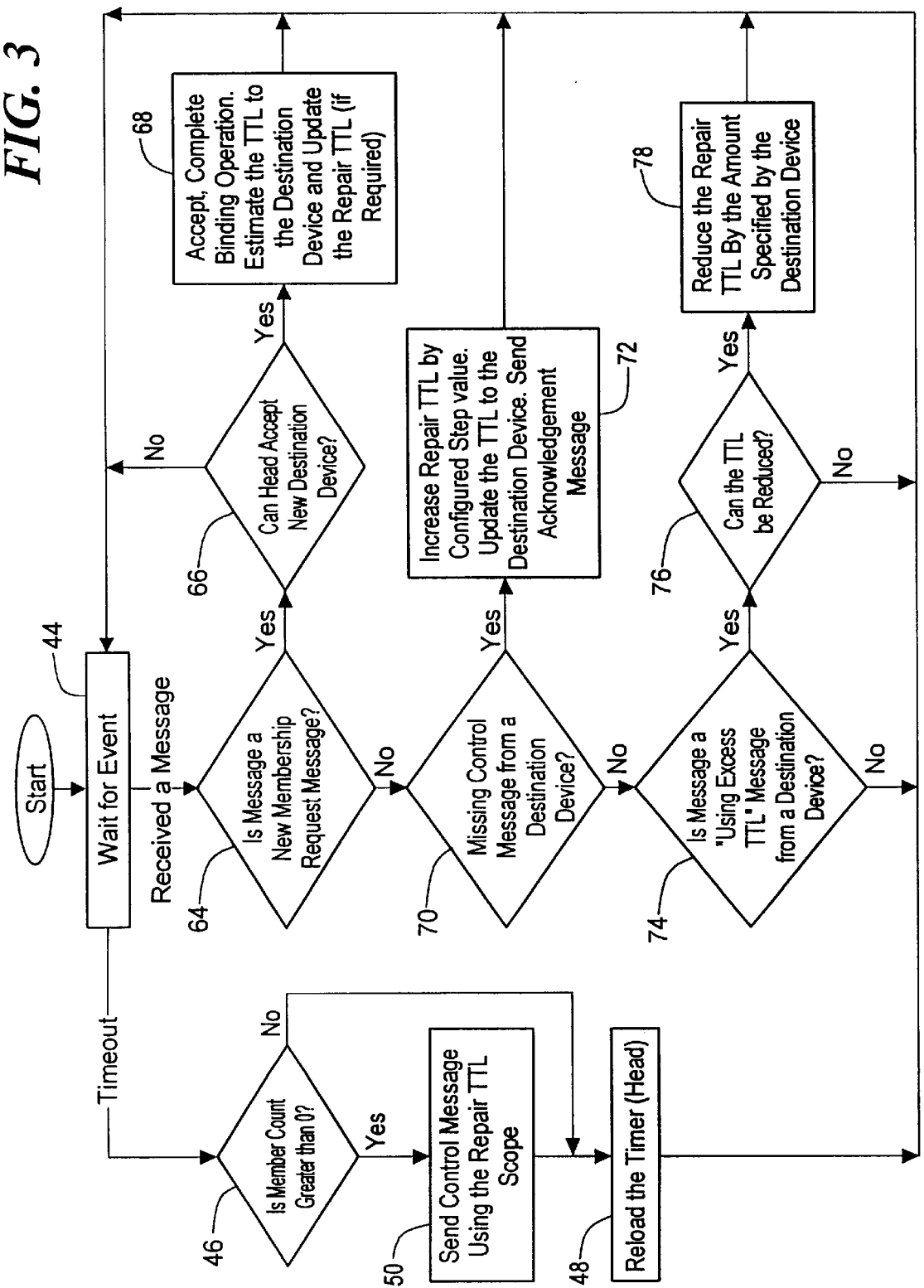
FIG. 3 is a flow diagram illustrating a method for operating the head destination device consistent with the present invention.

Methods consistent with the present invention for operating the standard destination device and the repair head destination device are illustrated respectively in FIG. 2 and FIG. 3. Referring now to FIGS. 1–3, in an initial step 40 each standard destination device is associated with a repair head destination device via a binding process as is known in the art. A repair head destination device Member Count variable is established and updated through binding to indicate the total number of standard destination devices that are associated with the repair head destination device. The binding process also includes calculating the number of intermediate network devices that are interposed between the repair head destination device and each associated standard destination device. Results from the binding process are employed to set a value that is utilized as the repair TTL designator. A single calculated repair TTL value may be employed for all repair data units transmitted from the repair head destination device. If the repair head destination device is associated with a plurality of standard destination devices, the repair TTL value is set large enough to enable transmission to the standard destination device having the greatest number of intermediate devices interposed between the repair head destination device and the standard destination device.

Following the binding operation the standard destination device waits for an event to occur, as indicated in step 42, and then reacts based upon the event type. One type of standard destination device event is a timeout of a counter that is maintained in the standard destination device. Another type of standard destination device event is the receipt of a message from an associated repair head destination device. In the event of a standard destination device counter timeout, a feedback message 38 is transmitted to the repair head destination device to indicate that an anticipated control message 36 was not received, as indicated by step 60. The counter is then reset as indicated in step 56, and flow returns to step 42.

In the event that the standard destination device receives a message from the repair head destination device, the standard destination device determines whether the message is a control message as indicated by step 52. If the received message is not a control message then the standard destination device determines whether the received message is an acknowledgement message as indicated by step 54. If the received message is not an acknowledgement message then flow returns to step 42. If the received message is an acknowledgement message then the standard destination device counter is reset as indicated in step 56 and flow returns to step 42.

If the received message is determined to be a control message in step 52, a TTL difference value is calculated and, if necessary, an excess TTL message is prepared as indicated by step 58. The TTL difference value is calculated by subtracting the IP TTL from the dispatch TTL. If the TTL difference is equal to zero, the excess TTL message is not prepared. If the TTL difference is greater than zero then the excess TTL message 37, including an indication of the calculated TTL difference, is transmitted to the repair head destination device.

As depicted in FIG. 3, the repair head destination device waits for an event to occur, as indicated in step 44, and then reacts according to the type of event that occurs. One type of repair head destination device event is a timeout of a counter that is maintained in the repair head destination device. Another type of repair head destination device event is receipt of a message from an associated standard destination device. In the event of a counter timeout in the repair head destination device, the repair head destination device determines whether the Member Count variable that indicates the number of standard destination devices associated with the repair head destination device is greater than zero as indicated in step 46. If the Member Count variable is not greater than zero, i.e., no standard destination devices are associated with the repair head destination device, then the counter is reset as indicated in step 48 and flow returns to step 44. If the Member Count variable is greater than zero as determined in step 46, thereby indicating that at least one standard destination device is associated with the repair head destination device, then a control message is multicast from the repair head destination device to every associated standard destination device as indicated in step 50. The Repair TTL value is employed as the IP TTL for the control message data unit. A dispatch TTL value is also loaded in the control message. After the repair head destination device has sent the control message the counter is reset as indicated in step 48, and flow returns to step 44.

The repair head destination device responds to receipt of a message from the standard destination device by determining whether the message includes a membership request message as indicated by step 64. If the message includes a membership request message from a standard destination device, the repair head destination device determines whether to become associated with the standard destination device in accordance with predefined criteria as indicated in step 66. If the repair head destination device determines not to become associated with the standard destination device then flow returns to step 44. If the repair head destination device determines to become associated with the standard destination device then the association is initialized as indicated by step 68. During initialization the standard destination device is bound with the repair head destination device and a TTL value required to transmit data units from the repair head destination device to the standard destination device is estimated. If the estimated TTL value is greater than the current repair TTL value, the repair TTL value is set equal to the estimated TTL value. Otherwise, the repair TTL value is not changed. Following initialization flow returns to step 44.

If the message received by the repair head destination device does not include a membership request from a destination device, the repair head destination device determines whether the message includes a feedback message indicating that a control message timeout has occurred at the standard destination device as indicated by step 70. If the message is a feedback message, then the repair TTL value is increased by a predetermined value as indicated in step 72. Further, the repair head destination device transmits an acknowledgement message 39 to the standard destination device.

If the message is not a feedback message as determined in step 70, the repair head destination device determines whether the message is an excess TTL message as indicated in step 74. If the message is not an excess TTL message then flow returns to step 44. If the message is an excess TTL message then the repair head destination device determines whether the designated TTL value can be reduced as indicated in step 76. In particular, the repair head destination device calculates whether the standard destination device Be that transmitted the excess TTL message has more intermediate devices interposed between that standard destination device and the repair head destination device than any other standard destination device associated with the repair head destination device and, if so, reduces the repair TTL. If the standard destination device that transmitted the excess TTL message has fewer intermediate devices interposed between it and the repair head destination device relative to at least one other standard destination device associated with the repair head destination device, then the repair head destination device does not adjust the repair TTL in response to the excess TTL message from the standard destination device, i.e., the TTL cannot be reduced. If the TTL cannot be reduced as determined in step 76, flow returns to step 44. If the TTL can be reduced as determined in step 76, the repair TTL is reduced by the excess amount reported by the standard destination device as indicated in step 78. Hence, the repair TTL value is dependent upon the number of intermediate devices interposed between the repair head destination device and the most distant standard destination device that is associated with the repair head destination device, measured in number of hops.

Figure 4:
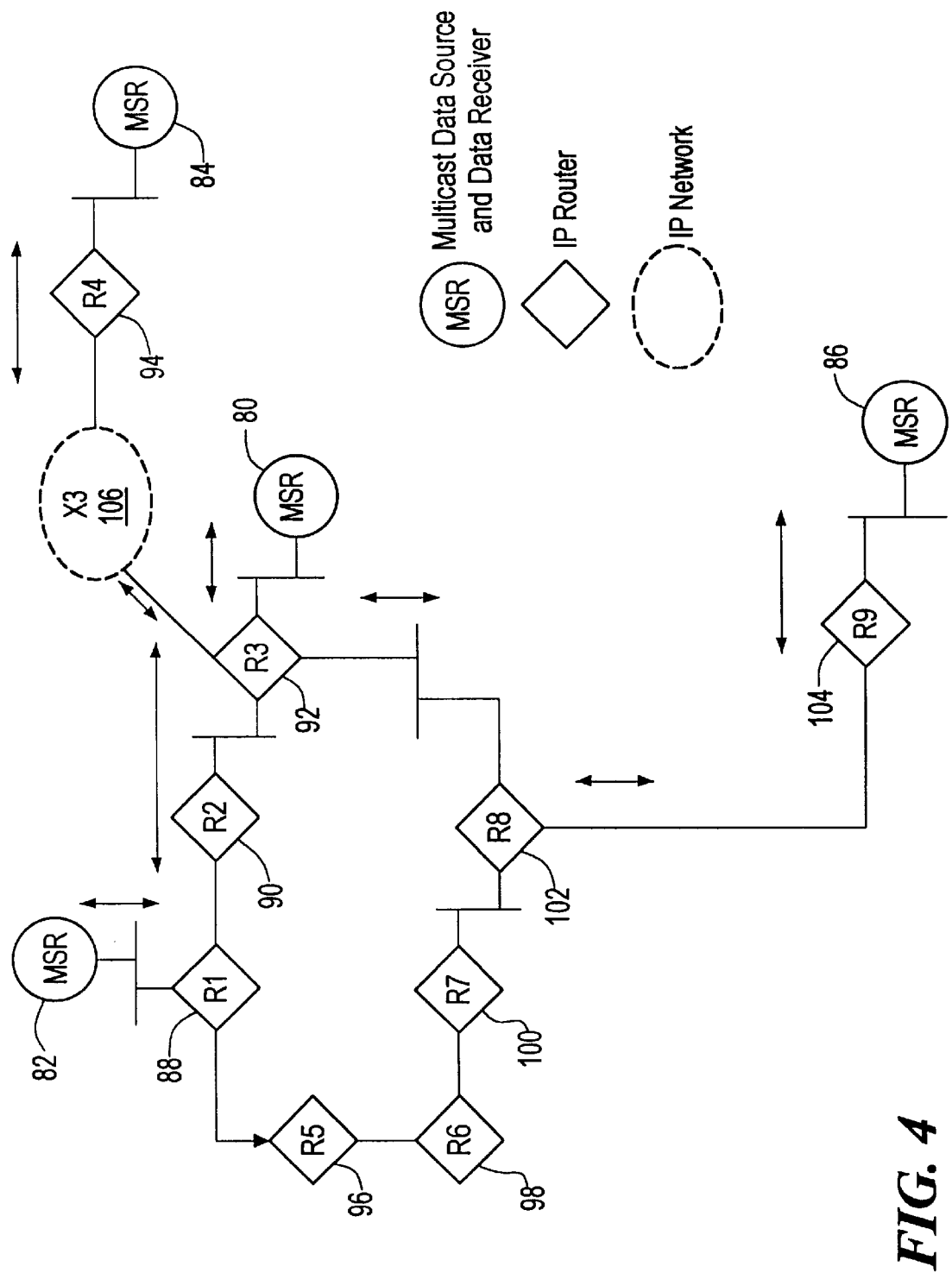
FIG. 4 is a schematic representation of a communications network utilizing dynamic TTL designator computation prior to severance of a network path consistent with the present invention.
Figure 5:
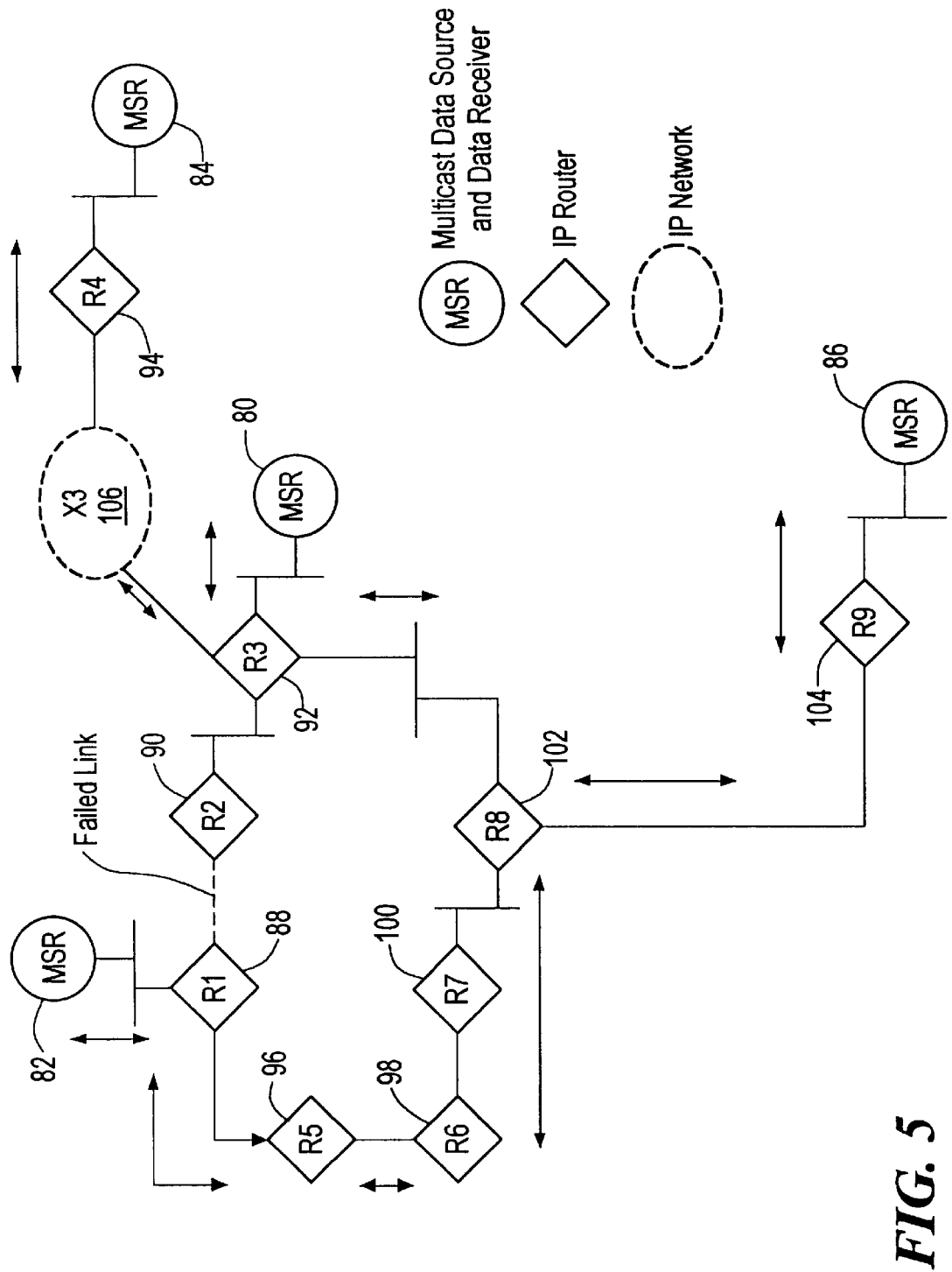
FIG. 5 is a schematic representation of a communications network utilizing dynamic TTL designator computation subsequent to severance of a network path consistent with the present invention.

FIGS. 4 and 5 are illustrative of the response to changing conditions in an exemplary network. In particular, FIG. 4 illustrates conditions prior to a link failure and FIG. 5 illustrates conditions following the link failure. Referring to FIG. 4, the illustrated network includes Multicast Data Source and Destination devices 80, 82, 84, 86, router devices 88, 90, 92, 94, 96, 98, 100, 102 and 104, and an Internet Protocol ("IP") Network 106. The Multicast Data Source and Destination devices 80, 82, 84, 86 may function as both source devices and destination devices. The router devices 88, 90, 94, 102 and 104 function as intermediate network devices. Device 80 functions as a repair head destination device for the purposes of the present example. The IP network 106 includes a number of intermediate network device hops, which for the purposes of the illustrated example is assumed to be three hops ("X3").

In the case where device 86 functions as a source device and devices 80, 82 and 84 function as destination devices for a multicast transmission, three separate multicast data paths are employed. A multicast data unit transmitted from device 86 to device 82 traverses routers 104, 102, 92, 90 and 88. A multicast data unit transmitted from device 86 to device 84 traverses routers 104, 102, 92, three hops in IP Network 106, and router 94. A multicast data unit transmitted from device 86 to device 80 traverses device 104, device 102 and device 92.

Because the path from device 86 to device 84 includes seven hops, which comprises a greater number of hops than any other path employed in the multicast transmission, the path from device 86 to device 84 is employed to set the session TTL. Further, because the path from repair head destination device 80 to standard destination device 84 includes five hops and the path from repair head destination device 80 to standard destination device 82 includes three hops, the path from repair head destination device 80 to standard destination device 84 is employed to set the repair TTL.

Referring now to FIG. 5, when the link between repair head destination device 80 and standard destination device 82 fails between intermediate devices 88 and 90, the data units transmitted from repair head destination device 80 to standard destination device 82 are re-routed along a path via device 92, device 102, device 100, device 98, device 96 and device 88. However, the repair TTL may not be large enough to enable transmission of control messages from repair head destination device 80 to standard destination device 82 because the new path from repair head destination device 80 to standard destination device 82 includes more hops than the path from repair head destination device 80 to standard destination device 84 which was employed to set the repair TTL. In particular the new path from device 80 to device 82 includes six hops while the path from device 80 to device 84 which was employed to set the repair TTL includes only five hops.

If the control messages from the repair head destination device 80 are discarded enroute to standard destination device 82, because of insufficient TTL or other reasons, the counter in standard destination device 82 times-out and a feedback message is transmitted from standard destination device 82 to repair head destination device 80. After the feedback message is received by repair head destination device 80, the repair head destination device transmits an acknowledgement message to the destination device 82. In response to the feedback message the repair head destination device 82 increases the repair TTL by a predetermined value such as 10 or by a calculated value based upon the path from repair head destination device 80 to standard destination device 82, which is now the longest path measured in number of hops. The updated repair TTL enables control messages and repair data units to be transmitted from repair head destination device 80 to standard destination device 82.

The repair TTL may subsequently be adjusted for improved efficiency via at least one excess TTL message from destination device 82. For example, if the repair TTL was increased by ten in response to the feedback message from device 82, the updated repair TTL value would be fifteen (five plus ten). After receiving excess TTL messages from each standard destination device the repair head destination device 80 would calculate that a repair TTL value of six would suffice to enable transmission to each associates standard destination device.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A method for facilitating the transmission of a repair data unit in a network including at least one source device, at least one destination device and at least one repair head destination device, comprising the steps of:

transmitting a first message employing a first hop count limiter from the repair head destination device to the destination device;

providing a message failure indication to the repair head destination device if the first message is not received by the destination device within a predetermined period of time;

increasing the first hop count limiter if the message failure indication is provided;

transmitting a multicast data unit employing a second hop count limiter that is greater than the first hop count limiter from the source device toward the destination device and the repair head destination device;

retaining a copy of the multicast data unit that can be accessed by the repair head destination device;

transmitting a request for repair to the repair head destination device if the multicast data unit is not received by the destination device; and in response to the request for repair, transmitting a repair data unit employing the first hop count limiter from the repair head destination device toward the destination device.

2. The method of claim 1 wherein the first message includes a static indication of the first hop count limiter and a dynamic first hop count limiter variable that is initialized at the repair head destination device to the designated first hop count limiter, and further including the step of decrementing the dynamic hop count limiter variable at each network device interposed between the repair head destination device and the destination device during transmission.

3. The method of claim 2 including the further step of determining the difference between the static indication of the first hop count limiter and the dynamic hop count limiter variable after receiving the first message at the destination device and reducing the first hop count limiter if the difference for each destination device is greater than a predetermined positive value.

4. A method for facilitating the determination of a Time To Live ("TTL") designation for use with a repair data unit transmitted from a first device to a second device when at least one intermediate network device is interposed along at least one active communication path between the first device and the second device, comprising the steps of:

transmitting a first message from the first device to the second device, said first message including a first TTL designation that is decremented at each intermediate network device and a second TTL designation that is not decremented at each intermediate network device;

calculating how many intermediate devices are disposed along the active path from the first device to the second device by computing the difference between the first TTL designation and the second TTL designation; and setting the TTL designation for the repair data unit to a value that is large enough to enable transmission through the calculated number of intermediate devices disposed along the active path from the first device to the second device.

5. The method of claim 4 including the further step of transmitting a second message from the second device to the first device if the first message is not received by the second device.

6. The method of claim 5 including the further step of increasing the TTL designation for the repair data unit in response to the second message.

7. The method of claim 6 including the further step of transmitting a third message from the second device to the first device if the calculated number of intermediate devices disposed along the active path from the first device to the second device is less than the TTL designation.

8. The method of claim 7 including the further step of decreasing the TTL designation for the repair data unit in response to the third message.

9. Apparatus for facilitating the transmission of a repair data unit, comprising:

at least one source device;

at least one destination device; and at least one repair head destination device operative to transmit a first message having a first hop count limiter to the destination device;

said destination device being operative to provide a message failure indication to said repair head destination device if said first message is not received by said destination device within a predetermined period of time;

said repair head functioning to increase said first hop count limiter if said message failure indication is provided;

said source device being operative to transmit a multicast data unit having a second hop count limiter that is greater than said first hop count limiter toward said destination device and said repair head destination device;

said repair head destination device being operative to retain a copy of said multicast data unit;

said destination device being operative to transmit a request for repair to said repair head destination device if said multicast data unit is not received by said destination device;

said repair head destination device being operative in response to said request for repair to transmit a repair data unit employing said first hop count limiter toward the destination device.

10. The apparatus of claim 9 wherein said first message includes a static indication of said first hop count limiter and a dynamic first hop count limiter variable that is initialized at said repair head destination device to said designated first hop count limiter, said dynamic hop count limiter variable being decremented at each network device interposed between said repair head destination device and said destination device during transmission.

11. The apparatus of claim 10 wherein said destination device determines the difference between said static indication of said first hop count limiter and said dynamic hop count limiter variable after receiving said first message.

12. The apparatus of claim 11 wherein said repair head a device reduces said first hop count limiter if the difference for each said destination device is greater than a predetermined positive value.

13. A method for facilitating the determination of a Time To Live ("TTL") designation for use with a repair data unit transmitted from a repair head device to destination devices when at least one intermediate network device is interposed along at least one active communication path between the repair head device and at least one of the destination devices, comprising the steps of:

monitoring, in the repair head device, the path between the repair head device and the destination devices by transmitting control messages to each destination device including a dispatched TTL value and an Internet Protocol ("IP") TTL value;

in the event of transmission failure, increasing the TTL value employed for the control message; and employing the TTL value with repair data units transmitted from the repair head device to the destination devices.

14. The method of claim 13 including the step of decreasing the TTL value employed for the control message if the TTL value is more than large enough to enable transmission through the calculated number of intermediate devices disposed along the active path from the repair head device to each destination device.

15. A method for facilitating the determination of a Time To Live ("TTL") designation for use with a repair data unit transmitted from a repair head device to destination devices when at least one intermediate network device is interposed along at least one active communication path between the repair head device and at least one of the destination devices, comprising the steps of:

in each destination device, responding to failure to receive a control message from the repair head device by transmitting a transmission failure indication to the repair head destination device; and responding to successful receipt of a control message by calculating a TTL value required to transmit a data unit from the repair head to the standard destination device, the TTL value being calculated by subtracting an Internet Protocol (IP) TTL value contained in the control message from a dispatched TTL value contained in the control message.

16. The method of claim 15 including the step of transmitting an excess-TTL indication to the repair destination device if the calculated TTL value is non-zero.

* * * * *

UNITED STATES PATENT AND TRADEMARK OFFICE
CERTIFICATE OF CORRECTION

PATENT NO.    : 6,104,695
DATED         : August 15, 2000
INVENTOR(S)   : Joseph S. Wesley et al.

Page 1 of 1

It is certified that error appears in the above-identified patent and that said Letters Patent is hereby corrected as shown below:

Column 7,
Line 49, please delete "Be"; and

Column 11,
Line 15, please delete "a".

Signed and Sealed this

Seventh Day of May, 2002

Attest:

JAMES E. ROGAN
Director of the United States Patent and Trademark Office

Attesting Officer